US010657054B2

(12) United States Patent
Vajravel et al.

(10) Patent No.: US 10,657,054 B2
(45) Date of Patent: May 19, 2020

(54) HANDLING RENAMES IN AN OVERLAY OPTIMIZER

(71) Applicant: Dell Products L.P., Round Rock, TX (US)

(72) Inventors: Gokul Thiruchengode Vajravel, Rayasandra Bengaluru (IN); Ankit Kumar, Deoghar (IN); Puneet Kaushik, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 16/057,707

(22) Filed: Aug. 7, 2018

(65) Prior Publication Data

US 2020/0050546 A1 Feb. 13, 2020

(51) Int. Cl.
*G06F 12/00* (2006.01)
*G06F 12/08* (2016.01)
*G06F 12/0806* (2016.01)
*G06F 3/06* (2006.01)

(52) U.S. Cl.
CPC .......... *G06F 12/0806* (2013.01); *G06F 3/061* (2013.01); *G06F 3/0635* (2013.01); *G06F 3/0644* (2013.01); *G06F 3/0673* (2013.01); *G06F 2212/1016* (2013.01)

(58) Field of Classification Search
None
See application file for complete search history.

(56) References Cited

U.S. PATENT DOCUMENTS

2012/0311263 A1* 12/2012 Kamath ................ G06F 3/0622 711/118
2013/0173744 A1* 7/2013 Xinglong .............. G06F 3/0659 709/217

* cited by examiner

*Primary Examiner* — Yong J Choe
(74) *Attorney, Agent, or Firm* — Kirton McConkie; Brian Tucker (57) ABSTRACT

Renames can be handled in an overlay optimizer to ensure that the rename operations do not fail due to source and target volumes being different. The overlay optimizer can implement a process for linking the two IRP_MJ_CREATE operations that the operating system sends as part of a rename operation. Due to this linking, the overlay optimizer can determine when the second IRP of a rename operation is being processed and can determine the source volume for the operation. When the source volume is the volume of the overlay cache, the overlay optimizer can redirect the second IRP. This will ensure that the rename operation will complete successfully even in cases where the rename operation was initiated without specifying the MOVEFILE_COPY_ALLOWED flag.

20 Claims, 12 Drawing Sheets

① As a result of the user's interactions, a file, File1.txt, is stored in overlay 140

*FIG. 4A*

② The overlay-managing write filter moves the file to the overlay cache

HANDLING RENAMES IN AN OVERLAY OPTIMIZER

CROSS-REFERENCE TO RELATED APPLICATIONS

N/A

BACKGROUND

The Windows Embedded and Windows operating systems include functionality that can prevent the content of a storage medium from being changed. In a typical example, it may be desirable to prevent the operating system image, which may be stored on a particular disk partition or on flash media, from being changed at runtime. To accomplish this, Windows provides a file-based write filter which operates at the file level and a block-based write filter (or enhanced write filter) that operates at the block level to redirect all writes that target a protected volume to a RAM or disk cache called an overlay. This overlay stores changes made to the operating system at runtime but is removed when the device is restarted thereby restoring the device to its original state.

Figure 1:
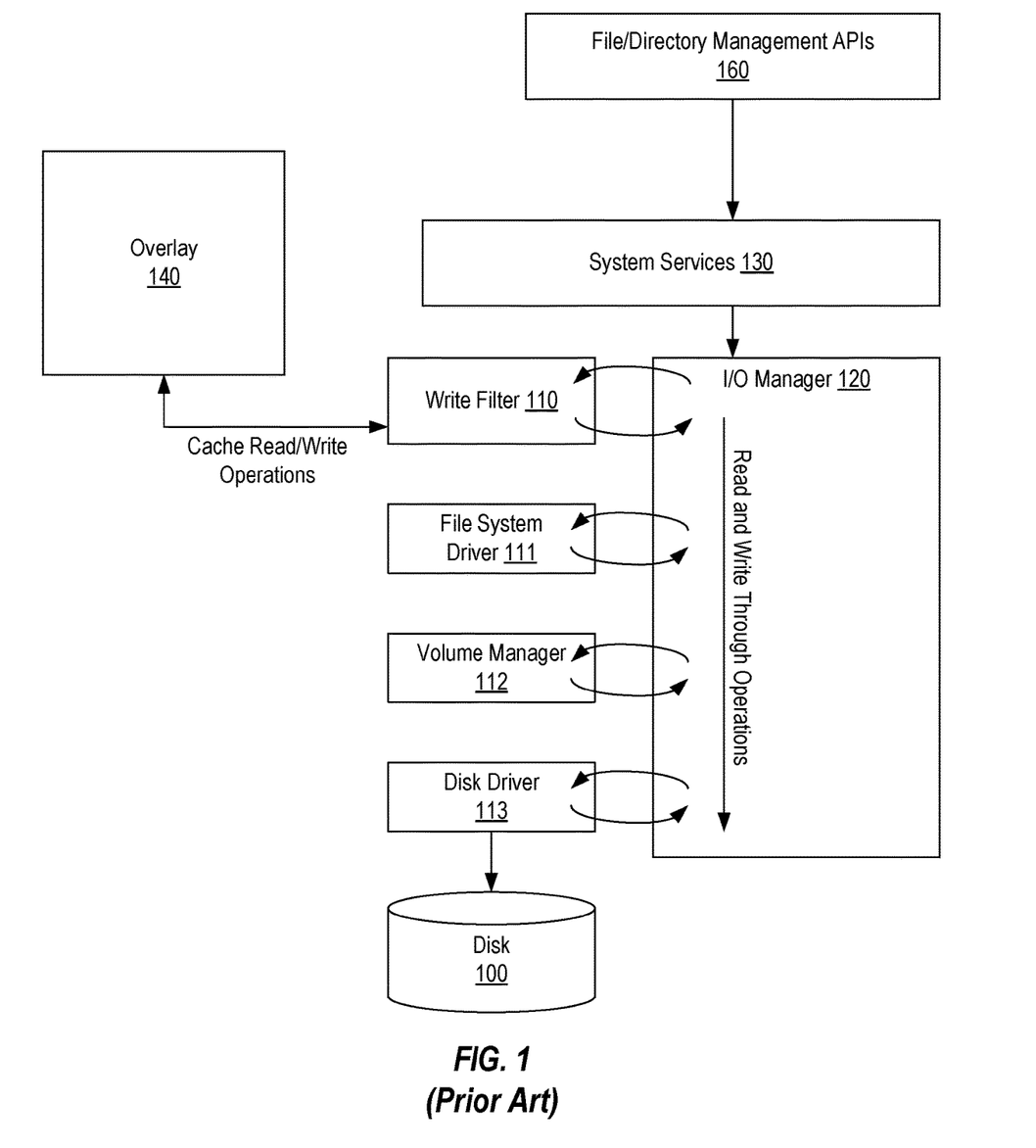
FIG. 1 illustrates a Windows-based I/O system in which a write filter is employed to redirect writes targeting a protected volume to an overlay.

FIG. 1 illustrates how a write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, write filter 110 is positioned at the top of the driver stack and will therefore be able to process an IRP prior to the IRP being passed down to the lower level drivers. Write filter 110 can be configured to detect writes targeting a protected volume and redirect them to overlay 140 rather than allowing them to be passed down the driver stack unchanged. As a result, the write will actually occur in overlay 140 rather than to disk 100. Write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

The size of the overlay employed by the Windows write filter is static and cannot be changed without rebooting. For example, the UWF_OverlayConfig.SetMaximumSize function allows the size of the overlay, in megabytes, to be specified. However, when this function is called, it has no effect on the size of the overlay during the current session. Instead, the specified size of the overlay will not be applied until the next session.

One problem that results from the static size of the overlay is that the system will be automatically rebooted if the overlay becomes full. The user will not be presented with an option to reboot in this scenario. Over time, it is likely to become full and force the reboot of the system. As a result, the user experience can be greatly degraded when a write filter is employed. Also, if the size of the overlay is set too high, the system may not have enough RAM left to run multiple applications or even the operating system.

U.S. patent application Ser. No. 15/422,012, titled "Mechanism To Free Up The Overlay Of A File-Based Write Filter" (the '012 application) describes techniques for employing an overlay-managing write filter in conjunction with the write filter to monitor files that are stored in the overlay and move files that are not currently being accessed to thereby minimize the size of the overlay. If a request is made to access a moved file, the overlay-managing write filter can modify the request so that it targets the location of the moved file rather than the location of the original file on the protected volume. In this way, the fact that modified files are being moved from the overlay can be hidden from the write filter. As a result, the effective size of the overlay will be increased while still allowing the write filter to function in a normal fashion.

Figure 2:
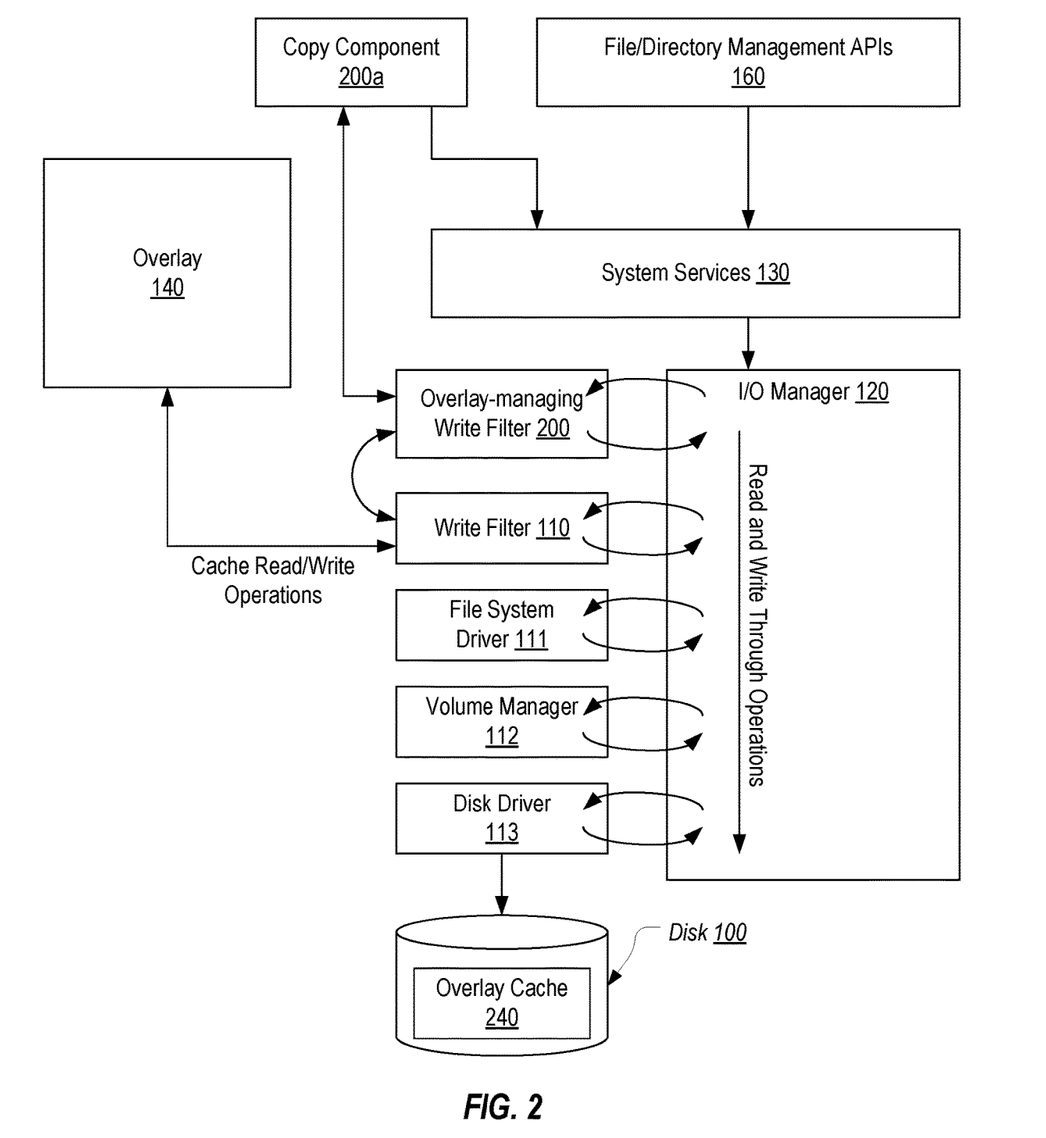
FIG. 2 illustrates how an overlay optimizer can be employed in conjunction with the write filter of FIG. 1 to free up the overlay.
Figure 3:
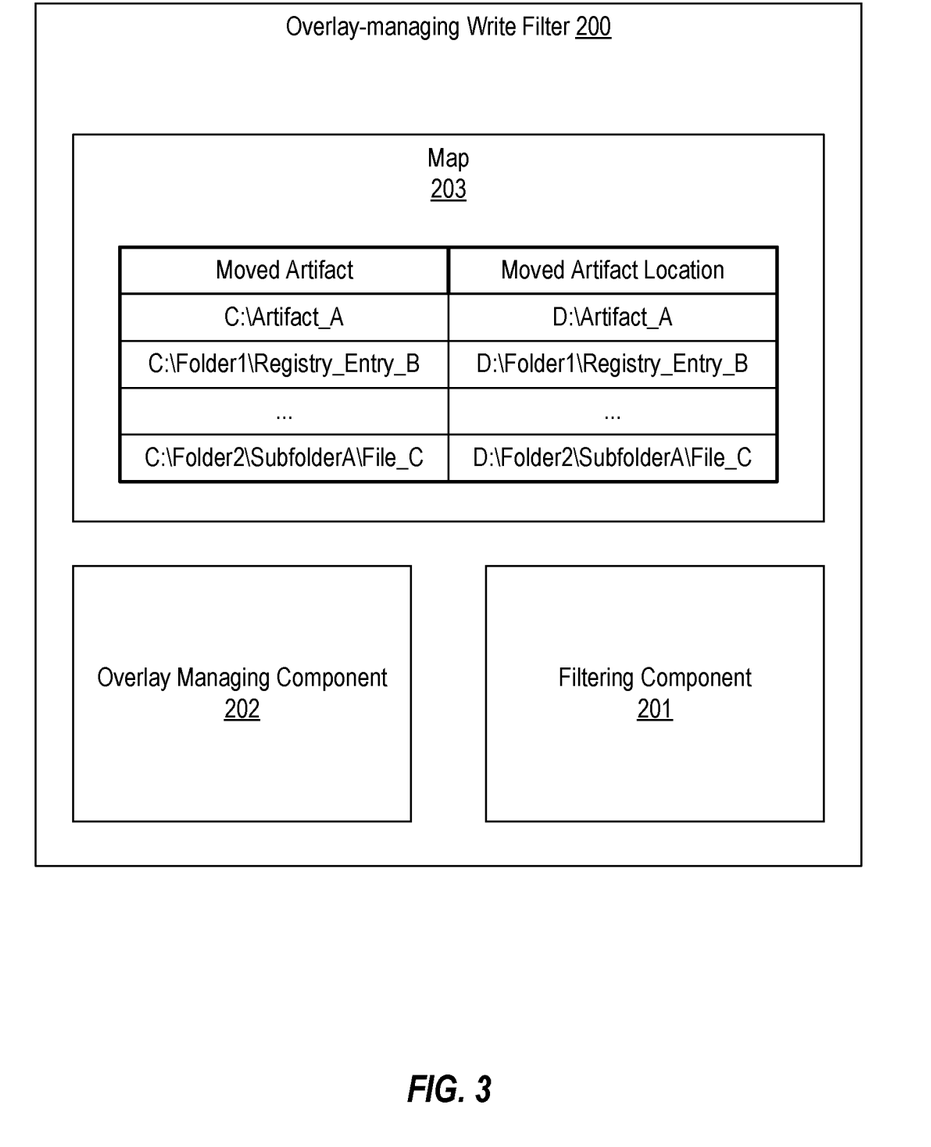
FIG. 3 illustrates various example components of an overlay optimizer.

FIGS. 2 and 3 and the following discussion is taken from the description of the '012 application and is intended to provide an overview of one environment in which the present invention can be implemented. FIG. 2 is based on FIG. 1 and illustrates how an overlay-managing write filter 200 can be used in conjunction with write filter 110 to manage artifacts (e.g., files, folders, registry entries, etc.) that are stored in overlay 140. More particularly, overlay-managing write filter 200 can monitor which artifacts in overlay 140 are not currently being accessed and can move them to an overlay cache 240 on disk 100.

For purposes of this description, it will be assumed that overlay 140 and overlay cache 240 are implemented on two separate volumes. For example, overlay 140 can be implemented on the C: volume while overlay cache 240 can be implemented on the D: volume. Therefore, when overlay-managing write filter 200 moves an artifact from overlay 140 to overlay cache 240, it will be a cross-volume move. Also, if overlay cache 240 is implemented on a separate volume from the protected volume, write filter 110 will not modify any operations targeting overlay cache 240.

In some embodiments, this moving of artifacts can be carried out by employing a copy component 200a of overlay-managing write filter 200 that may preferably run in user mode. After moving an artifact to overlay cache 240, overlay-managing write filter 200 can cause the artifact to be discarded from overlay 140 thereby reducing the size of overlay 140 to prevent overlay 140 from becoming full. To ensure that the modifications that were made to the artifact are not lost, overlay-managing write filter 200 can monitor I/O requests to allow it to intercept a request to access an artifact that has been moved to overlay cache 240 and cause the request to be redirected to overlay cache 240. In this way, the fact that overlay-managing write filter 200 moves artifacts to overlay cache 240 will be hidden from write filter 110.

FIG. 3 provides an example of various components of overlay-managing write filter 200. As shown, overlay-managing write filter 200 can include a filtering component 201 and an overlay managing component 202. Filtering component 201 can generally represent the portion of overlay-managing write filter 200 that functions as a filter driver in the device stack for disk 100 (or, more specifically, in the stack for the protected volume). Accordingly, filtering component 201 can be configured to process IRPs that target artifacts on the protected volume. Importantly, because overlay-managing write filter 200 is positioned above write filter 110, filtering component 201 will be able to process these IRPs before they are handled by write filter 110.

Overlay managing component 202 can generally represent the portion of overlay-managing write filter 200 that is configured to interface with write filter 110 and possibly copy component 200a for the purpose of managing which artifacts are moved from overlay 140 to overlay cache 240 and for ensuring that subsequent requests to access a moved artifact can be handled in the proper manner (e.g., by identifying and modifying requests that target a moved artifact so that the moved artifact (which would be the modified version of the artifact) will be accessed from overlay cache 240 rather than from its permanent location on disk 100). The distinction between filtering component 201 and overlay managing component 202 is for illustrative purposes only and any suitable configuration of the functionality of overlay-managing write filter 200 may be employed.

As shown in FIG. 3, overlay-managing write filter 200 can also maintain a map 203 which identifies which artifacts have been moved to overlay cache 240 as well as the specific location in overlay cache 240 where these moved artifacts are stored. Overlay managing component 202 can be configured to update and maintain map 203 based on which artifacts are moved to overlay cache 240. Overlay managing component 202 and/or filtering component 201 may also employ map 203 to properly redirect an I/O request that targets a moved artifact.

In the Windows operating system, a user mode application typically employs one of the MoveFile APIs to perform a file rename. For example, the MoveFile function takes as input the existing filename and the new filename. To implement the rename, the operating system will open the existing file (e.g., using IoCreateFileEx and specifying the existing filename as input) to obtain the file's information (the "source"), open (or create) the target of the rename (e.g., using IoCreateFileEx and specifying the new filename as input) to determine whether the source and target of the rename operation are on the same volume, and then use the source file's information to modify the target file so that it is a replica of the source file (e.g., using ZwSetInformationFile).

Of relevance to the present discussion, this process will result in three IRPs being passed down the I/O stack: (1) an IRP_MJ_CREATE for the first call to IoCreateFileEx which opens the source file; (2) an IRP_MJ_CREATE for the second call to IoCreateFileEx which opens/creates the target file; and (3) an IRP_MJ_SET_INFORMATION that updates the target file with the source file's information.

By default, if the source and target of a rename operation are not on the same volume, the operating system will fail the rename. The reason for failing the cross-volume rename is because it would require copying the file to the target volume rather than simply updating the file system data structure to reflect a new path to the existing file. To make this determination, the operating system will extract the targeted volume from the results of the second IRP_MJ_CREATE and compare it to the source volume obtained from the results of the first IRP_MJ_CREATE. If the target volume does not match the source volume, the operating system will fail the rename operation and will therefore not send the IRP_MJ_SET_INFORMATION.

To force the operating system to implement the rename across volumes, the user mode application can set the MOVEFILE_COPY_ALLOWED flag. In such cases, if the operating system determines that the source and target volumes are not the same, it will still proceed with the rename by copying the source file's information to the target file's information using the IRP_MJ_SET_INFORMATION. The MOVEFILE_COPY_ALLOWED flag is not available in the MoveFile function but is available in the MoveFileEx, MoveFileWithProgress, and MoveFileTransacted functions.

How the operating system implements renames creates a number of difficulties when an overlay optimizer is employed. For example, if overlay cache 240 is implemented on a separate volume (e.g., D:) from the protected volume (e.g., C:), any attempt to rename a file that exists in overlay cache 240 will likely be a cross-volume rename. For example, if a user mode application attempts to rename a file from C:\folder1\file.txt to C:\folder2\file.txt, when in fact the file is stored in D:\folder1, overlay-managing write filter 200 would cause the first IRP_MJ_CREATE to open the file in D:\folder1 which would not match the targeted C: volume. If the user mode application called MoveFile to initiate this rename, the operating system will fail the rename with STATUS_NOT_SAME_DEVICE. To address this issue, the user mode application could be modified to employ the MOVEFILE_COPY_ALLOWED flag, but this is not always possible or desirable.

BRIEF SUMMARY

The present invention extends to methods, systems, and computer program products for handling renames in an overlay optimizer to ensure that the rename operations do not fail due to source and target volumes being different. The overlay optimizer can implement a process for linking the two IRP_MJ_CREATE operations that the operating system sends as part of a rename operation. Due to this linking, the overlay optimizer can determine when the second IRP of a rename operation is being processed and can determine the source volume for the operation. When the source volume is the volume of the overlay cache, the overlay optimizer can redirect the second IRP. This will ensure that the rename operation will complete successfully even in cases where the rename operation was initiated without specifying the MOVEFILE_COPY_ALLOWED flag.

In some embodiments, the present invention is implemented by a write filter that implements an overlay cache as a method for preventing a failure of a rename operation when the overlay cache is implemented on a separate volume from a protected volume. The write filter receives a first I/O operation that successfully opened a file that exists in the overlay cache that is implemented on a separate volume from a protected volume and stores an identifier of the first I/O operation in association with an identifier of the separate volume. The write filter then receives a second I/O operation, obtains an identifier of the second I/O operation, and determines that the identifier of the second I/O operation matches the identifier of the first I/O operation. Based on the determination, the write filter identifies the separate volume as a source volume for the second I/O operation and redirects the second I/O operation to the separate volume.

In other embodiments, the present invention is implemented by a write filter as a method for preventing a failure of a rename operation. The write filter receives, via a post operation callback function, a first I/O operation that opened or created a file. The write filter determines an identifier of the first I/O operation and a volume on which the file was opened or created, and stores an entry in a data structure that associates the identifier of the first I/O operation and the volume. The write filter then receives, via a pre operation callback function, a second I/O operation. The write filter determines an identifier of the second I/O operation and searches the data structure using the identifier of the second I/O operation. Upon determining that the identifier of the second I/O operation matches the identifier of the first I/O operation stored in the entry, the write filter obtains the volume defined in the entry as a source volume for the second I/O operation. The write filter determines that the source volume for the second I/O operation is a volume on which the write filter implements an overlay cache which is separate from a protected volume. The write filter then redirects the second I/O operation to the volume rather than allowing the second I/O operation to be directed to the protected volume.

In other embodiments, the present invention is implemented, in a system that includes a write filter that implements an overlay for protecting contents of a protected volume and an overlay-optimizing write filter that implements an overlay cache on a separate volume from the protected volume, as a method for preventing a rename operation from failing. The overlay-optimizing write filter receives an IRP_MJ_CREATE operation and determines that the IRP_MJ_CREATE operation includes the SL_OPEN_TARGET_DIRECTORY flag. The overlay-optimizing write filter obtains a process identifier associated with the IRP_MJ_CREATE operation and uses the process identifier to search a data structure containing entries that each maps a process identifier to a volume. The overlay-managing write filter determines that the process identifier associated with the IRP_MJ_CREATE operation matches an entry in the data structure and determines that the volume defined in the matching entry is the separate volume on which the overlay cache is implemented. The overlay-managing write filter then redirects the IRP_MJ_CREATE operation to the separate volume.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Prior to describing the techniques of the present invention, an overview of how write filter 110 would handle a modification to a file will be provided. An understanding of this typical handling of file modifications will provide context for how the present invention handles renames that may involve modified files. As introduced in the background, write filter 110 will redirect any attempt to modify the contents of a protected volume (hereinafter the C:\ volume) so that the modifications are maintained in overlay 140. Whenever a file or folder is modified and therefore stored in overlay 140, overlay-managing write filter 200 will move that file or folder to overlay cache 240 once all handles are closed. Accordingly, a file may be stored in overlay cache 240 (which is assumed to be the D:\ volume) but will appear to the user as if it were stored on the C:\ volume.

Figure 4A:
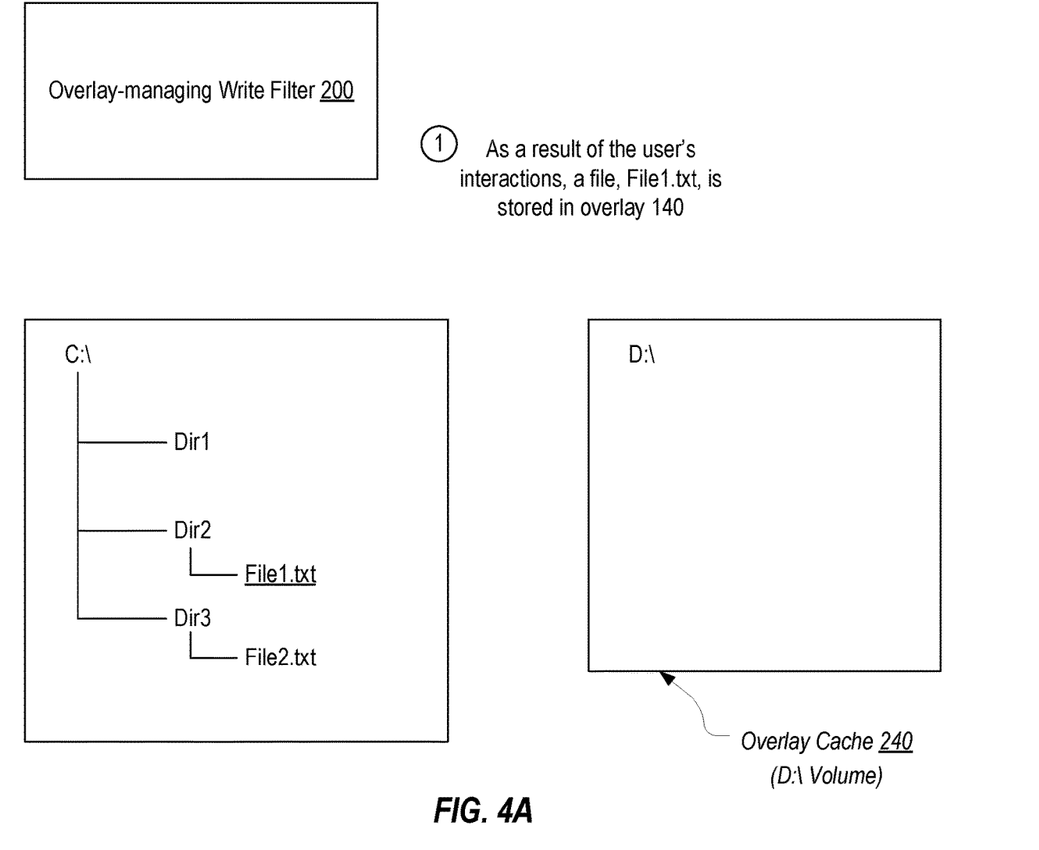
FIGS. 4A and 4B illustrate how the overlay optimizer can redirect an IRP to the overlay cache.
Figure 4B:
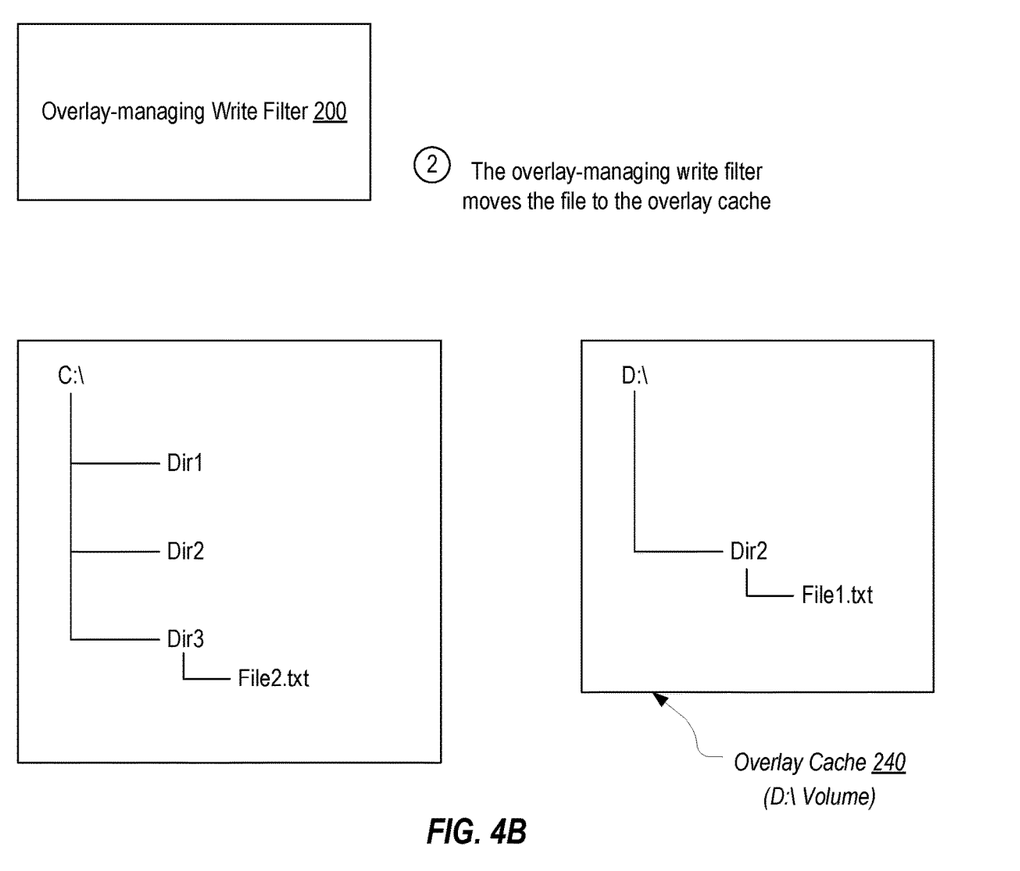

FIGS. 4A and 4B illustrate how overlay-managing write filter 200 can move a file from overlay 140 to overlay cache 240. For simplicity, these figures, as well as the subsequent figures, will represent the contents of the C:\ volume and the contents of overlay 140 as a single hierarchy (i.e., the merged view that write filter 110 would provide). However, artifacts that are stored in overlay 140 will be underlined within this hierarchy. Of course, the hierarchy from the user's perspective would be modified to match whatever is stored in overlay cache 240 (i.e., the merged view that overlay-managing write filter 200 would provide). The specification and the claims make reference to a file or folder being stored or existing on the protected volume. Such references should be construed as including instances where the file or folder is stored in overlay 140.

As represented in step 1 of FIG. 4A, it is assumed that the user's interactions have caused a file named File1.txt to be stored in overlay 140. For example, the user could have modified an existing file or created a file at C:\Dir2\File1.txt. Regardless of how File1.txt came to be stored in overlay 140, overlay-managing write filter 200 will move the file to overlay cache 240 in accordance with the process described in the background and as is represented in step 2 of FIG. 4B. In this example, it will be assumed that overlay-managing write filter 200 creates a similar path to the file on the D:\ volume, but this is not necessary. For example, File1.txt could be stored at any location on the D:\ volume with map 203 linking this location on the D:\ volume to the location of the original file on the C:\ volume.

FIGS. 5A-5E illustrate how overlay-managing write filter 200 can detect that a file is being renamed as well as how it can prevent the rename from failing due to the source and target volumes of the rename being different. In this example, it will be assumed that a user mode application has initiated a rename of the file, File1.txt, that has been moved to overlay cache 240 (at D:\Dir2\File1.txt) but will appear to the user mode application as if it existed at C:\Dir2\File1.txt.

Figure 5A:
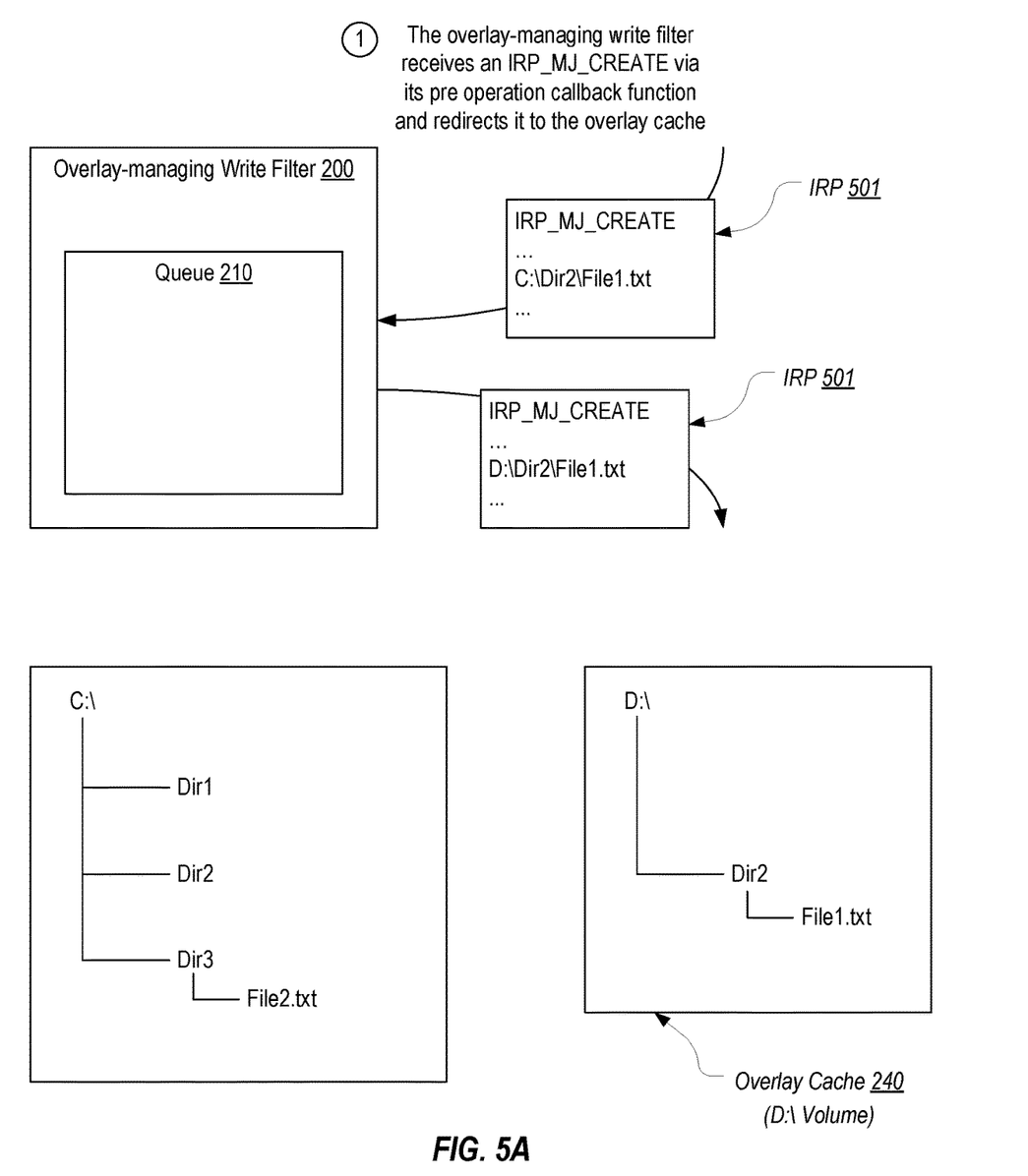
FIGS. 5A-5E illustrate how the overlay optimizer can detect the second IRP of a rename operation and prevent the rename operation from failing.

As addressed in the background, a rename operation will typically be implemented using one of the MoveFile functions that the Windows operating system provides. The operating system will implement the MoveFile function by creating two IRP_MJ_CREATE operations: a first to open the existing/source file; and a second to determine whether the target of the rename is on the same volume as the source. However, I/O manager 120 does not provide any indication that the two IRP_MJ_CREATE operations are related. Overlay-managing write filter 200 can be configured to implement a process for linking the two IRP_MJ_CREATE operations so that it can employ information from the first IRP_MJ_CREATE operation to prevent a rename operation from failing due to the target and source volumes not matching.

In step 1 shown in FIG. 5A, an IRP 501 is passed to overlay-managing write filter 200 as the IRP descends the file system stack. In other words, in step 1, I/O manager 120 (or more specifically, the filter manager of I/O manager 120) passes IRP 501 to overlay-managing write filter 200's pre operation callback function that is registered for IRP_MJ_CREATE operations. As is known, an IRP_MJ_CREATE operation can open or create a file identified by the path or filename specified in the IRP. As mentioned above, it will be assumed that IRP 501 provides a path of C:\Dir2\File1.txt. Since this file actually resides in overlay cache 240 (which overlay-managing write filter 200 can determine by accessing map 203), overlay-managing write filter 200 will redirect IRP 501 so that it targets D:\Dir2\File1.txt (which will result in a handle to D:\Dir2\File1.txt being returned).

This processing in step 1 is the typical processing that overlay-managing write filter 200 performs. As will become apparent below, overlay-managing write filter 200's pre operation callback function will perform this typical handling when the IRP_MJ_CREATE operation does not include the SL_OPEN_TARGET_DIRECTORY flag. In contrast, when the IRP_MJ_CREATE operation does not include the SL_OPEN_TARGET_DIRECTORY flag, the customized functionality will be implemented in the post operation callback function as described below.

Figure 5B:
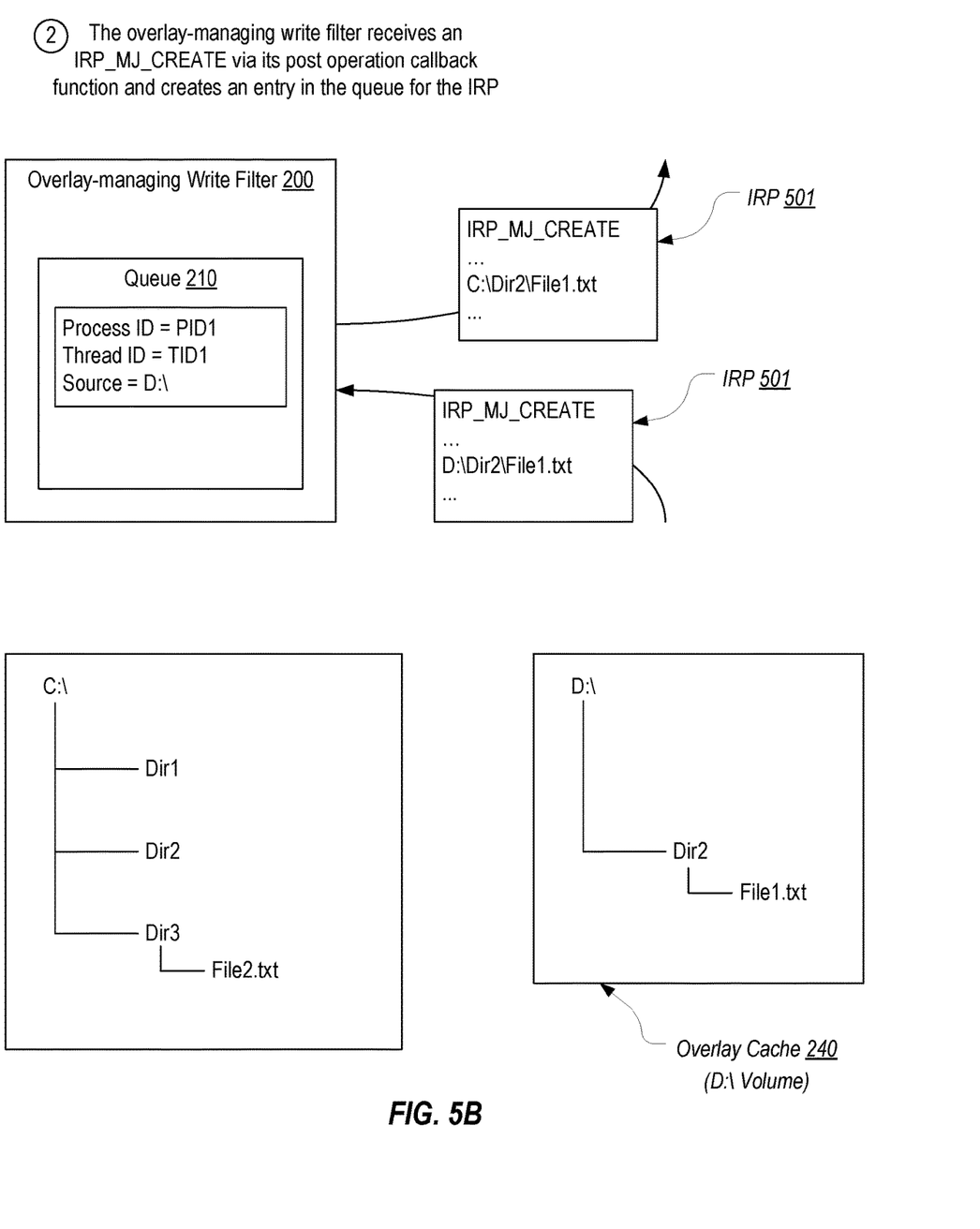

Turning to FIG. 5B, IRP 501 will be passed back up the I/O stack once the IRP has been completed and will therefore be provided to overlay-managing write filter 200's post operation callback function. As part of its post operation callback function for IRP_MJ_CREATE operations that do not include the SL_OPEN_TARGET_DIRECTORY flag and as represented in step 2, overlay-managing write filter 200 can obtain the thread ID and process ID of the process that initiated IRP 501. Any suitable technique can be employed to obtain these IDs including, for example, obtaining the thread ID from the Tail.Overlay.Thread field of IRP 501 and then using the IoThreadToProcess API to obtain the process ID from the thread ID. By employing the thread ID to obtain the process ID, overlay-managing write filter 200 can ensure that the originating process, and not some intermediary process such as another filter, will be identified. Overlay-managing write filter 200 can also determine the source volume for IRP 501 (e.g., from a fully qualified object name or from the directory specified in the accompanying Object Attributes structure). Overlay-managing write filter 200 can then store an entry 210a in queue 210 that maps the process ID and thread ID to the source volume. In this example, it will be assumed that the process ID and thread ID associated with IRP 501 are PID1 and TID1 respectively. Also, because IRP 501 targets D:\Dir2\File1.txt, the source volume will be D:\. Overlay-managing write filter 200 can then pass the IRP up the I/O stack.

It is noted that this same process will be implemented on each IRP_MJ_CREATE operation that does not include the SL_OPEN_TARGET_DIRECTORY flag including those that pertain to a rename of a file that is not stored in overlay cache 240 and those that do not pertain to a rename, copy or other similar operation that involves two IRP_MJ_CREATE operations. For example, if the file to be renamed did not exist in overlay cache 240, overlay-managing write filter 200 would not redirect the first IRP in its pre operation callback function but would still create an entry in queue 210 in its post operation callback function. Similarly, if the IRP_MJ_CREATE operation was the result of a simple request to open a file, overlay-managing write filter 200 would still create an entry in queue 210 since there is no way of knowing at that time that the IRP does not pertain to a rename operation.

Figure 5C:
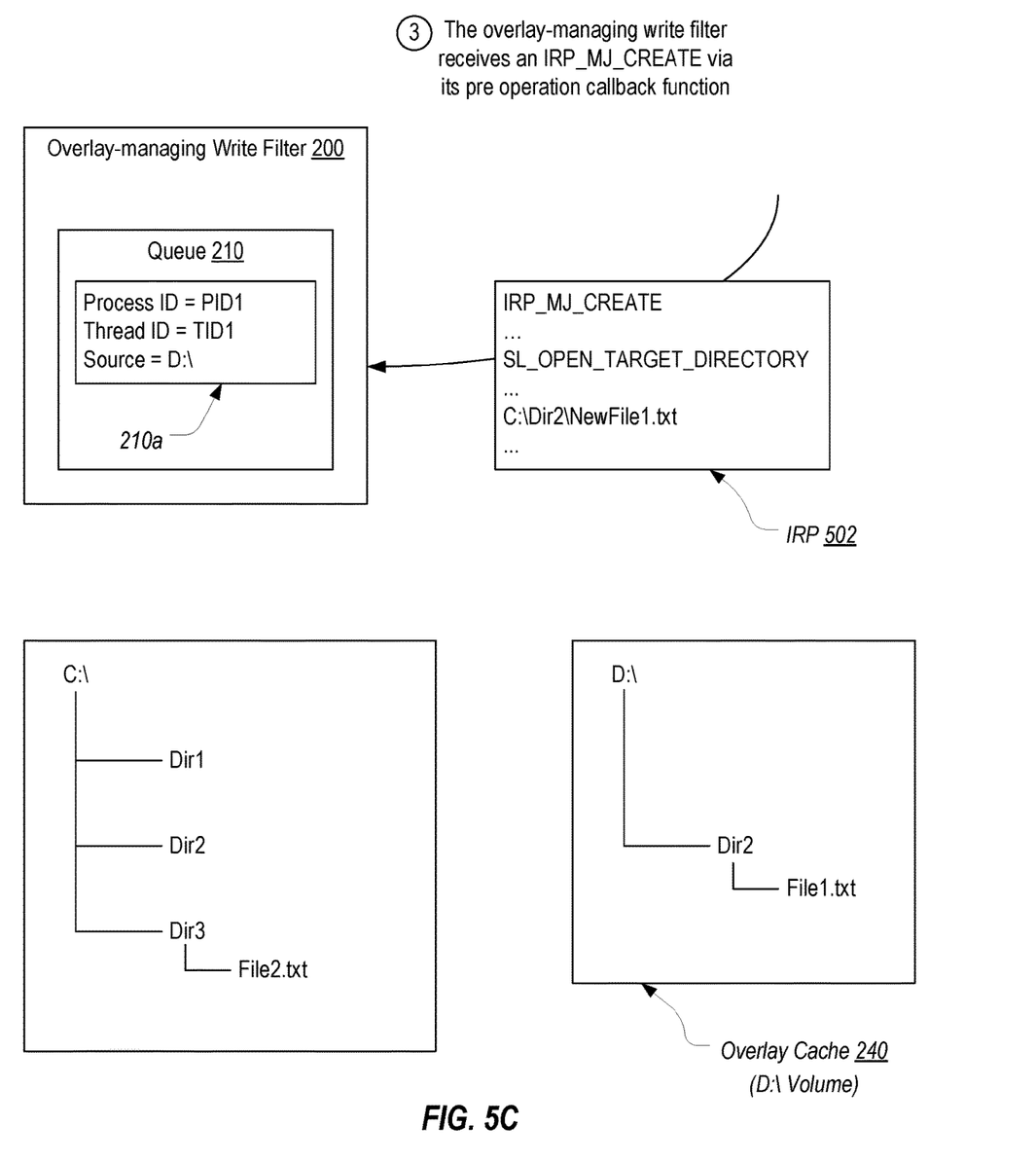

Turning to FIG. 5C, because IRP 501 is part of a rename operation, at some point, overlay-managing write filter 200 will receive the second IRP_MJ_CREATE operation that the operating system sends to determine whether the target volume of the rename operation is the same as the source volume. Accordingly, in step 3, IRP 502 is passed to overlay-managing write filter 200's pre operation callback function for IRP_MJ_CREATE operations. In this example, it will be assumed that File1.txt is being renamed to NewFile1.txt and therefore IRP 502 will specify C:\Dir2\NewFile1.txt as the target of IRP_MJ_CREATE operation. Also, because IRP 502 is the second IRP_MJ_CREATE, the operating system will have set the SL_OPEN_TARGET_DIRECTORY flag.

As part of this pre operation callback function, overlay-managing write filter 200 can first determine whether IRP 502 is the second IRP_MJ_CREATE operation of a rename. This can be accomplished by determining that the SL_OPEN_TARGET_DIRECTORY flag is set within IRP 502. Because this flag is set in IRP 502, overlay-managing write filter 200 can then employ the entries in queue 210 to identify the source volume for the rename operation of which IRP 502 forms a part.

Figure 5D:
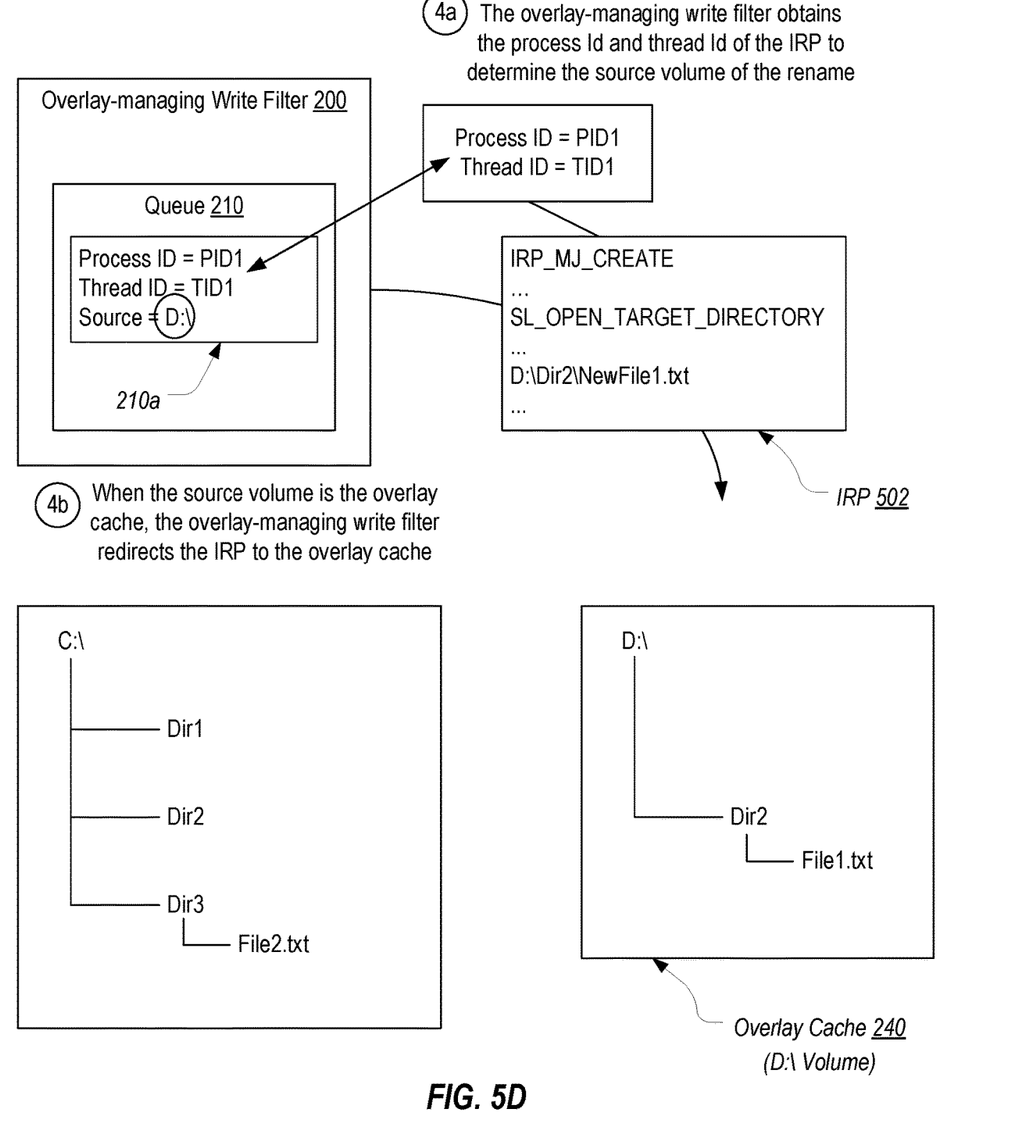

For example, in step 4a shown in FIG. 5D, overlay-managing write filter 200 can obtain the thread ID and the process ID of the process that initiated IRP 502. In this case, the process ID and thread ID will be PID1 and TID1 respectively. With this thread ID and process ID, overlay-managing write filter 200 can search queue 210 for a matching entry and will therefore locate entry 210a. Entry 210a will inform overlay-managing write filter 200 that the source volume for this move is the D:\ volume. More specifically, entry 210a will inform overlay-managing write filter 200 that the file that is being renamed resides on the D:\ volume. When a matching entry is found in queue 210, overlay-managing write filter 200 can remove it from queue 210.

Upon determining that IRP 502 pertains to a rename operation where the source volume is overlay cache 240 (the D:\ volume in this example), overlay-managing write filter 200 can then modify IRP 502 to redirect it to overlay cache 240. For example, in step 4b, overlay-managing write filter 200 has modified IRP 502 to target D:\Dir2\NewFile1.txt. Importantly, by redirecting IRP 502 to overlay cache 240, the source volume for IRP 501 and the target volume for IRP 502 will match thereby preventing the operating system from failing the rename operation due to the target volume not matching the source volume.

Figure 5E:
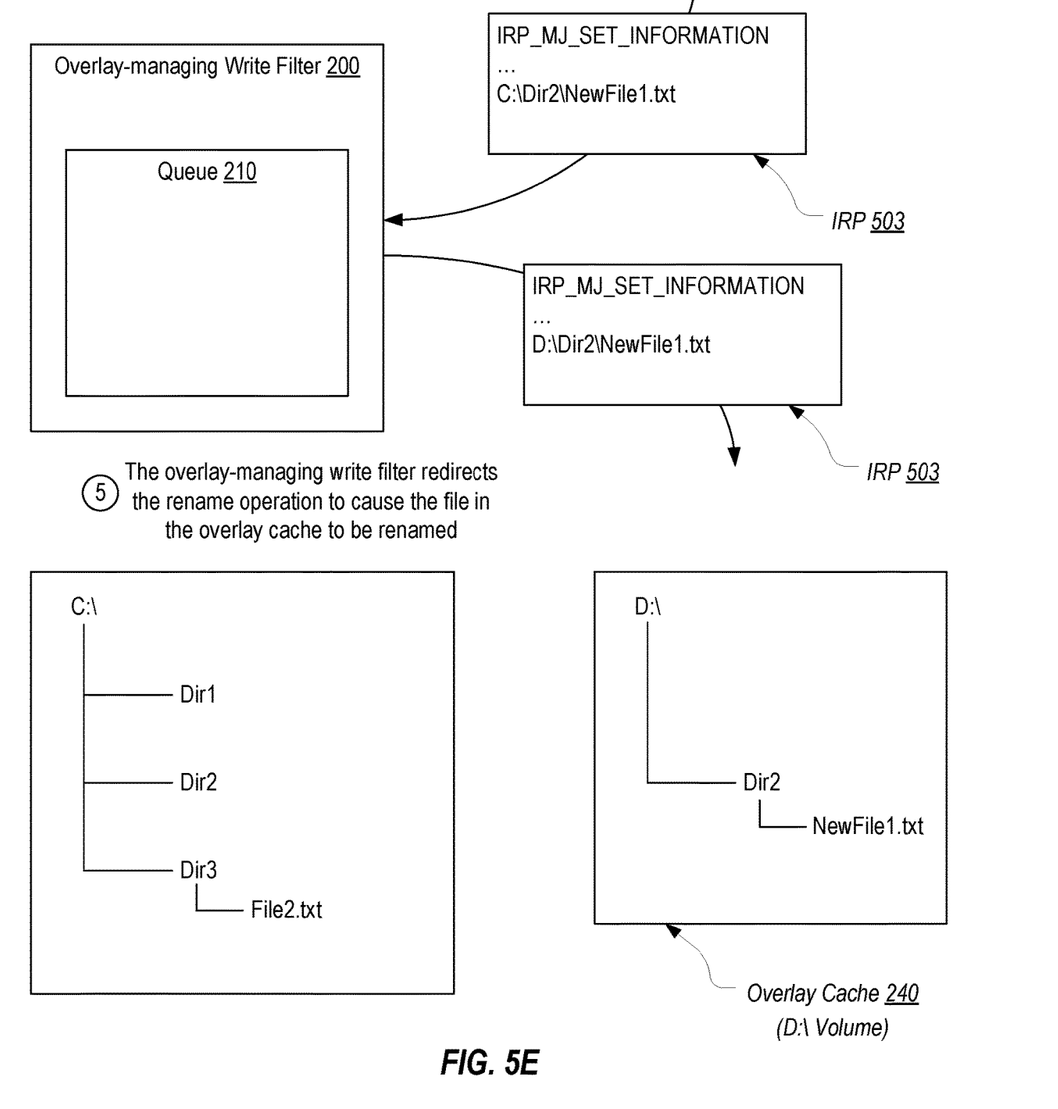

More specifically, as shown in step 5 of FIG. 5E, because overlay-managing write filter 200 ensures that the source and target are the same when a file stored in overlay cache 240 is renamed, the operating system will send IRP 503 (IRP_MJ_SET_INFORMATION) to implement the rename even when the MoveFile function is called without the MOVEFILE_COPY_ALLOWED flag set. Overlay-managing write filter 200 will redirect IRP 503 to overlay cache 240 thereby causing File1.txt to be renamed NewFile1.txt on the D:\ volume. Accordingly, overlay-managing write filter 200 ensures that the presence of overlay cache 240 remains unknown from the user perspective even when overlay cache 240 resides on a different volume from the protected volume.

Figure 6A:
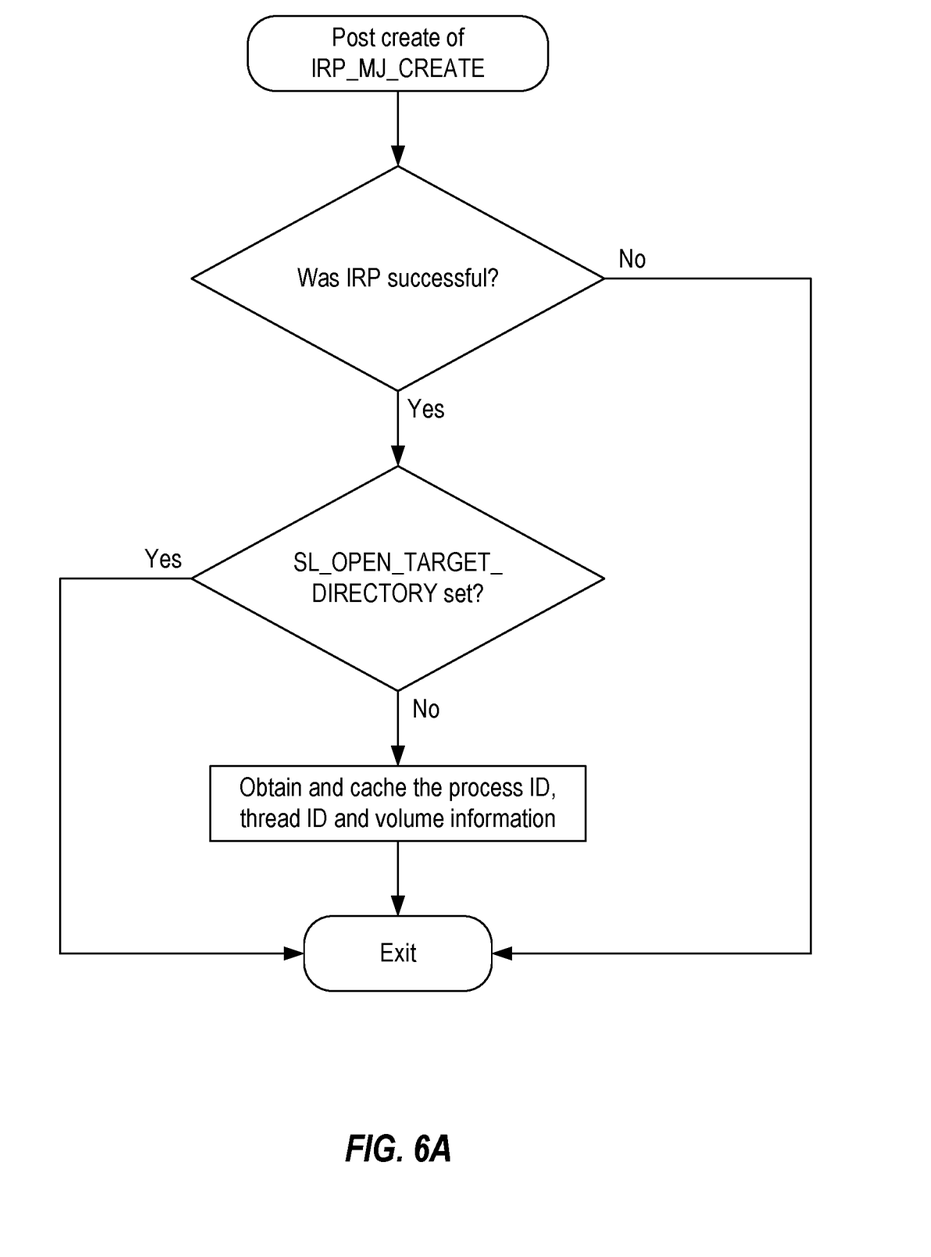
FIG. 6A illustrates a flow diagram of the functionality that can be performed within the post operation callback function of the overlay-optimizing write filter.

FIG. 6A provides a flow diagram representing the functionality performed by overlay-managing write filter 200 in its post operation callback function for IRP_MJ_CREATE operations. When an IRP_MJ_CREATE operation is provided to this post operation callback function, it can first determine whether the operation was successful. If not, overlay-managing write filter 200 can simply pass the IRP up the stack. However, if the operation was successful (meaning a file was opened or created), overlay-managing write filter 200 can determine whether the SL_OPEN_TARGET_DIRECTORY flag is set. If so, overlay-managing write filter 200 will take no special action (since IRPs with the SL_OPEN_TARGET_DIRECTORY flag set are handled in the pre operation callback function). However, if the SL_OPEN_TARGET_DIRECTORY flag is not set, which implies that the IRP could be the first IRP_MJ_CREATE of a rename or similar operation, overlay-managing write filter 200 will obtain and cache the process ID, thread ID and volume information for the IRP within queue 210. If the IRP is the first IRP of rename operation, this caching step will allow overlay-managing write filter 200 to subsequently detect when the second IRP_MJ_CREATE is sent. It is noted that overlay-managing write filter 200 will create entries in queue 210 for IRPs that do not pertain to a rename or similar operation that involves two IRP_MJ_CREATE operations. Although not shown in FIG. 6A, for this reason, overlay-managing write filter 200 can be configured to purge unmatched entries from queue 210 after some defined amount of time.

Figure 6B:
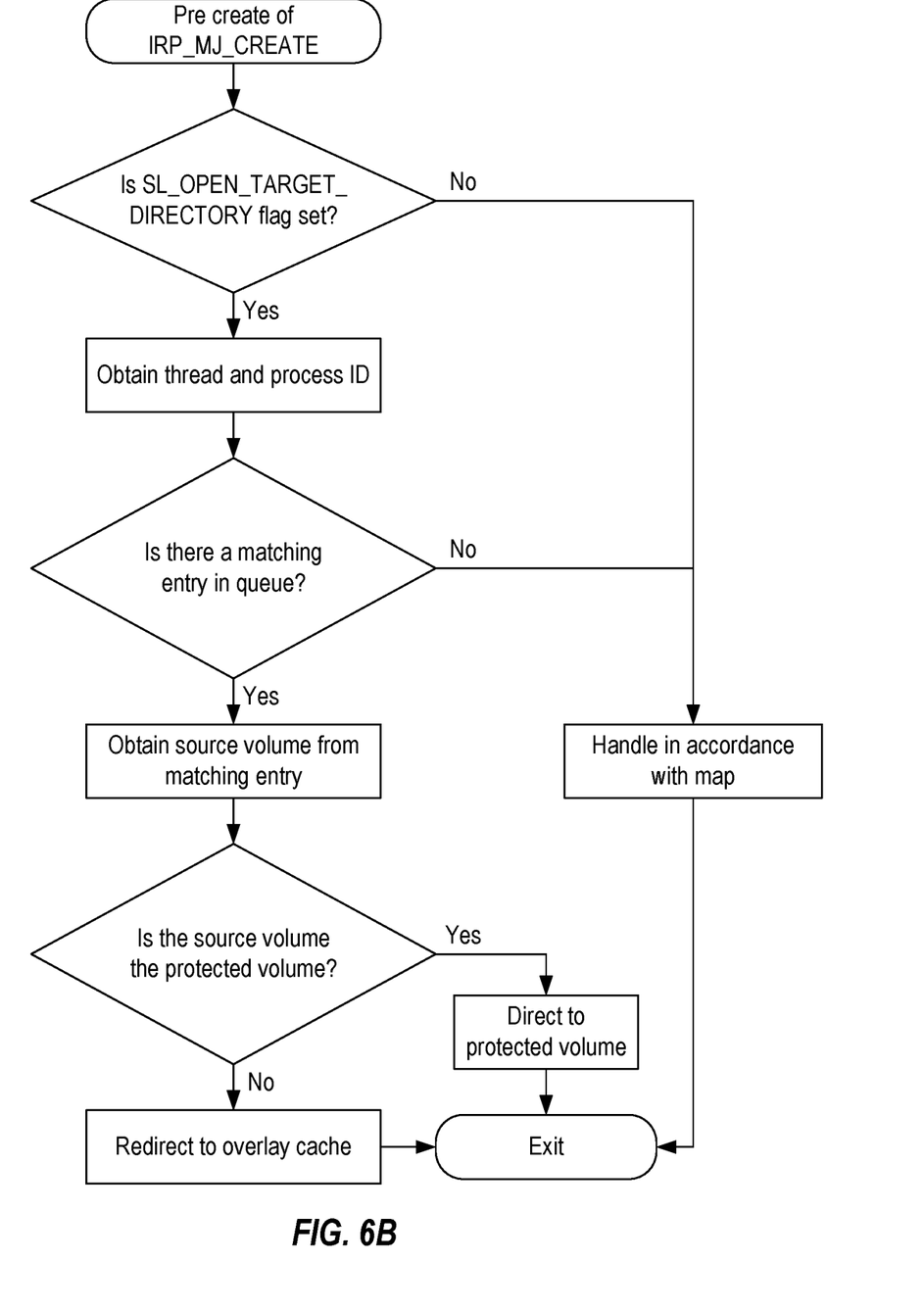
FIG. 6B illustrates a flow diagram of the functionality that can be performed within the pre operation callback function of the overlay-optimizing write filter.

FIG. 6B provides a flow diagram representing the functionality performed by overlay-managing write filter 200 in its pre operation callback function for IRP_MJ_CREATE operations. When an IRP_MJ_CREATE operation is passed to the pre operation callback function, overlay-managing write filter 200 can determine whether the SL_OPEN_TARGET_DIRECTORY flag is set. If the flag is not set, overlay-managing write filter 200 can handle the IRP in a typical manner based on map 203. For example, if the target of the IRP exists in overlay cache 240, the IRP can be redirected. Otherwise, the IRP can be directed to the protected volume (i.e., passed on unchanged).

If the SL_OPEN_TARGET_DIRECTORY flag is set, overlay-managing write filter 200 can obtain the thread and process IDs and use them to search queue 210 for a matching entry. If a matching entry is not found, the IRP can be handled in a typical fashion. In contrast, if a matching entry is found, which implies that this IRP is the second IRP of a rename, copy or other similar operation, overlay-managing write filter 200 can obtain the source volume from the matching entry.

Overlay-managing write filter 200 can then determine whether the source volume is the protected volume. If not (i.e., if the source volume is overlay cache 240), overlay-managing write filter 200 will redirect the IRP to overlay cache 240. In contrast, if the source volume is the protected volume, overlay-managing write filter 200 will direct the IRP to the protected volume.

It is noted that, in the case where the SL_OPEN_TARGET_DIRECTORY flag is set and a matching entry exists in queue 210 which defines the source volume as overlay cache 240, the target of the IRP likely will not exist in overlay cache 240. For example, with reference to IRP 502, C:\Dir2\NewFile1.txt does not exist in overlay cache 240. Therefore, absent the techniques of the present invention, IRP 502 would not be redirected to overlay cache 240 (because map 203 would not identify C:\Dir2\NewFile1.txt as having been moved to overlay cache 240). It is the implementation of the present invention that provides a way to selectively handle this type of IRP_MJ_CREATE operation for the purpose of preventing the failure of a rename operation.

In summary, overlay-managing write filter 200 can employ a technique for linking the two IRP_MJ_CREATE operations that occur when a file is renamed. By linking the two operations, overlay-managing write filter 200 can determine that the second IRP_MJ_CREATE operation pertains to a rename and can ensure that the rename operation will not span multiple volumes thereby ensuring that the IRP SET_INFORMATION FILE operation will be sent even if the MOVEFILE_COPY_ALLOWED flag is not set or is unavailable.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a write filter that implements an overlay cache, for preventing a failure of a rename operation when the overlay cache is implemented on a separate volume from a protected volume, the method comprising:
    receiving a first input/output (I/O) operation that successfully opened a file that exists in the overlay cache that is implemented on a separate volume from a protected volume;
    storing an identifier of the first I/O operation in association with an identifier of the separate volume;
    receiving a second I/O operation;
    obtaining an identifier of the second I/O operation;
    determining that the identifier of the second I/O operation matches the identifier of the first I/O operation;
    based on the determination, identifying the separate volume as a source volume for the second I/O operation; and
    redirecting the second I/O operation to the separate volume.

2. The method of claim 1, wherein the first I/O operation is a first IRP_MJ_CREATE operation.

3. The method of claim 2, wherein receiving the first IRP_MJ_CREATE operation comprises determining that the first IRP_MJ_CREATE operation does not include the SL_OPEN_TARGET_DIRECTORY flag.

4. The method of claim 1, wherein the identifier of the first I/O operation is an identifier of a process that initiated the first I/O operation.

5. The method of claim 1, wherein the identifier of the process that initiated the first I/O operation is obtained using a tread identifier defined in the first I/O operation.

6. The method of claim 1, wherein the second I/O operation comprises a second IRP_MJ_CREATE operation.

7. The method of claim 6, wherein receiving the second IRP_MJ_CREATE operation comprises determining that the second IRP_MJ_CREATE operation includes the SL_OPEN_TARGET_DIRECTORY flag.

8. The method of claim 1, wherein the storing identifier of the first I/O operation in association with the identifier of the separate volume comprises creating a first entry among many entries in a data structure, and wherein determining that the identifier of the second I/O operation matches the identifier of the first I/O operation comprises using the identifier of the second I/O operation to search the entries in the data structure.

9. The method of claim 1, wherein the first I/O operation is received via a post create callback function and the second I/O operation is received via a pre create callback function.

10. The method of claim 1, wherein the first and second I/O operations are IRP_MJ_CREATE operations, the method further comprising:
    receiving an IRP_MJ_SET_INFORMATION operation pertaining to the file; and
    redirecting the IRP_MJ_SET_INFORMATION operation to the separate volume.

11. One or more computer storage media storing computer executable instructions which when executed by one or more processors implement a method for preventing a failure of a rename operation, the method comprising:
    receiving, by a write filter via a post operation callback function, a first input/output (I/O) operation that opened or created a file;
    determining an identifier of the first I/O operation and a volume on which the file was opened or created;
    storing an entry in a data structure that associates the identifier of the first I/O operation and the volume;
    receiving, by the write filter via a pre operation callback function, a second I/O operation;
    determining an identifier of the second I/O operation;
    searching the data structure using the identifier of the second I/O operation;
    upon determining that the identifier of the second I/O operation matches the identifier of the first I/O operation stored in the entry, obtaining the volume defined in the entry as a source volume for the second I/O operation;
    determining that the source volume for the second I/O operation is a volume on which the write filter implements an overlay cache, the volume being separate from a protected volume; and
    redirecting the second I/O operation to the volume rather than allowing the second I/O operation to be directed to the protected volume.

12. The computer storage media of claim 11, wherein the first I/O operation is an IRP_MJ_CREATE operation that does not include the SL_OPEN_TARGET_DIRECTORY flag.

13. The computer storage media of claim 12, wherein the second I/O operation is an IRP_MJ_CREATE operation that includes the SL_OPEN_TARGET_DIRECTORY flag.

14. The computer storage media of claim 11, wherein the identifier of the first I/O operation and the identifier of the second I/O operation are both an identifier of a process that initiated the first and second I/O operations.

15. The computer storage media of claim 14, wherein the identifier of the process is obtained using a thread identifier defined in the corresponding first or second I/O operation.

16. The computer storage media of claim 11, wherein the method further comprises:
    receiving, by the write filter via the pre operation callback function, a third I/O operation;
    determining that the third I/O operation does not include the SL_OPEN_TARGET_DIRECTORY flag;
    determining that a target of the third I/O operation exists in the overlay cache; and
    redirecting the third I/O operation to the volume.

17. The computer storage media of claim 11, wherein the method further comprises:
    receiving, by a write filter via a post operation callback function, a third I/O operation that opened or created a second file;
    determining an identifier of the third I/O operation and a volume on which the second file was opened or created;
    storing a second entry in the data structure that associates the identifier of the third I/O operation and the volume on which the second file was opened or created;
    receiving, by the write filter via the pre operation callback function, a fourth I/O operation;
    determining an identifier of the fourth I/O operation;
    searching the data structure using the identifier of the fourth I/O operation;
    upon determining that the identifier of the fourth I/O operation matches the identifier of the third I/O operation stored in the second entry, obtaining the volume defined in the second entry as a source volume for the fourth I/O operation;
    determining that the source volume for the fourth I/O operation is the protected volume; and
    directing the fourth I/O operation to the protected volume rather than redirecting the fourth I/O operation to the volume on which the overlay cache is implemented.

18. A method, implemented in a system that includes a write filter that implements an overlay for protecting contents of a protected volume and an overlay-optimizing write filter that implements an overlay cache on a separate volume from the protected volume, for preventing a rename operation from failing, the method comprising:
- receiving, by the overlay-optimizing write filter, an IRP_MJ_CREATE operation;
- determining that the IRP_MJ_CREATE operation includes the SL_OPEN_TARGET_DIRECTORY flag;
- obtaining a process identifier associated with the IRP_MJ_CREATE operation;
- using the process identifier to search a data structure containing entries that each maps a process identifier to a volume;
- determining that the process identifier associated with the IRP_MJ_CREATE operation matches an entry in the data structure;
- determining that the volume defined in the matching entry is the separate volume on which the overlay cache is implemented; and
- redirecting the IRP_MJ_CREATE operation to the separate volume.

19. The method of claim 18, further comprising:
- receiving, by the overlay-optimizing write filter, a second IRP_MJ_CREATE operation;
- determining that the second IRP_MJ_CREATE operation includes the SL_OPEN_TARGET_DIRECTORY flag;
- obtaining a process identifier associated with the second IRP_MJ_CREATE operation;
- using the process identifier that is associated with the second IRP_MJ_CREATE operation to search the data structure;
- determining that the process identifier associated with the second IRP_MJ_CREATE operation matches a second entry in the data structure;
- determining that the volume defined in the second entry is the protected volume; and
- directing the second IRP_MJ_CREATE operation to the protected volume.

20. The method of claim 19, further comprising:
- receiving, by the overlay-optimizing write filter, a third IRP_MJ_CREATE operation;
- determining that the third IRP_MJ_CREATE operation does not include the SL_OPEN_TARGET_DIRECTORY flag;
- determining that a target of the third IRP_MJ_CREATE operation exists in the overlay cache; and
- redirecting the third IRP_MJ_CREATE operation to the separate volume.

* * * * *